(12) United States Patent
Kim et al.

(10) Patent No.: US 12,491,799 B2
(45) Date of Patent: Dec. 9, 2025

(54) POWER SWIVEL APPARATUS OF SEAT FOR VEHICLE

(71) Applicants: Hyundai Motor Company, Seoul (KR); Kia Corporation, Seoul (KR); DAS CO., LTD, Gyeongsangbuk-do (KR)

(72) Inventors: Ji Hwan Kim, Seoul (KR); Byung Yong Choi, Gyeonggi-do (KR); So Young Yoo, Gyeonggi-do (KR); Sang Uk Yu, Seoul (KR); Sang Ho Kim, Incheon (KR); Dong Woo Kim, Seoul (KR); Jae Ho Kim, Gyeonggi-do (KR); Young Joon Kim, Gyeonggi-do (KR); Ho Jin Jung, Gyeonggi-do (KR)

(73) Assignees: Hyundai Motor Company, Seoul (KR); Kia Corporation, Seoul (KR); DAS CO., LTD, Gyeongsangbuk-do (KR)

( * ) Notice: Subject to any disclaimer, the term of this patent is extended or adjusted under 35 U.S.C. 154(b) by 363 days.

(21) Appl. No.: 18/212,588

(22) Filed: Jun. 21, 2023

(65) Prior Publication Data
US 2024/0270125 A1   Aug. 15, 2024

(30) Foreign Application Priority Data
Feb. 10, 2023   (KR) .................. 10-2023-0017835

(51) Int. Cl.
*B60N 2/02* (2006.01)
*B60N 2/14* (2006.01)

(52) U.S. Cl.
CPC ......... *B60N 2/02246* (2023.08); *B60N 2/146* (2013.01); *B60N 2/02253* (2023.08)

(58) Field of Classification Search
CPC .......... B60N 2002/022; B60N 2/02253; B60N 2/02246; B60N 2/14; B60N 2/146
See application file for complete search history.

(56) References Cited

U.S. PATENT DOCUMENTS

| 7,108,325 | B2 | 9/2006 | Williamson et al. |
| 7,364,234 | B2 | 4/2008 | Begin et al. |
| 7,735,917 | B2 | 6/2010 | Jones et al. |
| 9,242,581 | B2 | 1/2016 | Farooq et al. |
| 10,336,215 | B2 | 7/2019 | Sowinski et al. |
| 2020/0223379 | A1 | 7/2020 | Kikkawa |
| 2021/0170921 | A1 | 6/2021 | Seibold et al. |

(Continued)

FOREIGN PATENT DOCUMENTS

| DE | 102017206941 A1 | * 10/2018 | ............... B60N 2/14 |
| KR | 20100110093 A | * 10/2010 | ............... B60N 2/14 |

(Continued)

*Primary Examiner* — Milton Nelson, Jr.
(74) *Attorney, Agent, or Firm* — Fox Rothschild LLP

(57) ABSTRACT

A power swivel apparatus of a seat for a vehicle includes a motor having an eccentric shaft, a reduction gear device connected to the eccentric shaft of the motor, a brake device configured such that braking of the brake device is released by eccentric rotational force of the reduction gear at a time of driving the motor and the brake device exhibits braking force configured to stop the seat at a time of stopping driving of the motor, and a swivel plate connected to the brake device and configured to transmit rotational force so as to swivel the seat.

20 Claims, 8 Drawing Sheets

(56) References Cited

U.S. PATENT DOCUMENTS

2022/0161694 A1    5/2022   Numajiri et al.
2023/0286419 A1*   9/2023   Mclaughlin .............. B60N 2/14

FOREIGN PATENT DOCUMENTS

| KR | 10-2148820   | B1 |   | 8/2020  |             |
|----|--------------|----|---|---------|-------------|
| KR | 20220069492  | A  | * | 5/2022  | ...... B60N 2/14 |
| KR | 10-2475848   | B1 |   | 12/2022 |             |
| KR | 10-2530200   | B1 |   | 5/2023  |             |
| WO | 2012/134448  | A1 |   | 10/2012 |             |
| WO | 2020/109626  | A1 |   | 6/2020  |             |

* cited by examiner

POWER SWIVEL APPARATUS OF SEAT FOR VEHICLE

CROSS-REFERENCE TO RELATED APPLICATION

This application claims under 35 U.S.C. § 119(a) the benefit of Korean Patent Application No. 10-2023-0017835 filed on Feb. 10, 2023, the entire contents of which are incorporated herein by reference.

BACKGROUND

(a) Technical Field

The present disclosure relates to a power swivel apparatus of a seat for a vehicle, more particularly, to the power swivel apparatus configured to perform a monopost function and a swivel function of the seat.

(b) Description of the Related Art

In autonomous vehicles that are capable of travelling without direct driver control, different types of seats may be provided. For example, the seats may include various mechanisms to allow for conversations and conferences between passengers, relaxation, sleeping, assistance in boarding and alighting, etc.

For example, a swivel seat is being developed that is capable of being rotated in a desired direction for the purpose of multilateral conferences and conversations, viewing of outdoor landscapes, relaxation, assistance in boarding and alighting, etc.

A swivel seat may be provided with a swivel apparatus having a designated mechanism, which typically is installed at a bottom part of the seat.

However, because a swivel structure and a driver are installed at the bottom part of the seat in a state in which the swivel structure and the driver are separated from each other, and the load of a passenger needs to be easily distributed, a conventional swivel apparatus is disadvantageous due to a large volume and packaging area required to accommodate the conventional swivel apparatus.

Further, as a usable area of a floor panel of an interior of a vehicle corresponding to the bottom part of the seat is reduced due to the large volume and packaging area of the conventional swivel apparatus, spatial constraints may result, and thus various convenience apparatuses having different functions, such as a removable console, are incapable of being installed.

In addition, the driver of the conventional swivel apparatus includes a power transmission unit in which a plurality of gears is combined, and when the seat is stopped during a swivel operation, movement of the seat and noise may be caused due to gear backlash of the power transmission unit.

In an electric vehicle, a battery module typically is installed under a floor panel, and thus a height of the floor panel is usually increased by the height of the battery module, and therefore, in order to eliminate space and height constraints of the floor panel for installation of a seat, a method of supporting a seat by a monopost may be used.

The monopost typically is provided to connect a bottom part of a slim seat to a floor panel so as to support loads of the seat and the passenger. Use of a monopost may provide advantages such as planarization of the floor panel and an increase in the usable area of the floor panel.

However, a conventional monopost, which connects the bottom part of the slim seat to the floor panel, has a very small volume and cross-sectional area, and thus there is a problem that separate additional apparatuses, such as a seat swivel apparatus, a seat height control apparatus, etc., are incapable of being installed on the conventional monopost.

The above information disclosed in this Background section is only for enhancement of understanding of the background of the disclosure and therefore it may contain information that does not form the prior art that is already known in this country to a person of ordinary skill in the art.

SUMMARY

The present disclosure provides a power swivel apparatus of a seat for vehicles in which a motor configured to perform the swiveling operation of the seat, a reduction gear device configured to increase the output torque of the motor, and a brake device configured to stop the seat without movement and noise during the swiveling operation of the seat are vertically stacked under the seat, so as not only to accurately perform the swiveling operation of the seat but also to perform the monopost function of the seat.

In one aspect, the present disclosure provides a power swivel apparatus of a seat for vehicles, including a motor having an eccentric shaft, a reduction gear device connected to the eccentric shaft of the motor, a brake device configured such that braking of the brake device is released by eccentric rotational force of the reduction gear at a time of driving the motor and the brake device exhibits braking force configured to stop the seat at a time of stopping driving of the motor, and a swivel plate connected to the brake device and configured to transmit rotational force so as to swivel the seat.

In a preferred embodiment, the motor, the reduction gear device, the brake device, and the swivel plate may be sequentially stacked from bottom to top so as to be formed as a monopost of the seat.

In another preferred embodiment, the motor may include a motor body, a stator mounted on an inner diametric part of the motor body, and a rotor mounted on an outer circumferential surface of the eccentric shaft and disposed to be spaced apart from the stator by a designated distance, and the eccentric shaft may be provided in a structure configured such that a round part inserted into the rotor is formed at a lower part of the eccentric shaft, and an eccentric part configured to transmit the eccentric rotational force to the reduction gear device is formed at an upper part of the eccentric shaft.

In still another preferred embodiment, a motor cover configured to cover the stator, the rotor, and the eccentric shaft may be mounted under a bottom part of the motor body.

In yet another preferred embodiment, a first bearing configured to guide rotation of the eccentric shaft may be mounted between an inner diametric surface of a lower end of the eccentric shaft and an outer diametric surface of an upper end of the motor cover.

In still yet another preferred embodiment, a movable plate coupled to a seat rail so as to be movable forwards and rearwards may be mounted under a bottom part of the motor cover.

In a further preferred embodiment, the reduction gear device may include a main body having a lower gear formed on an inner diametric part of the main body, and stacked on the motor body to be assembled therewith, a clutch plate having an upper gear formed as an internal gear on a lower part of the clutch plate, and a plurality of push blocks formed on an upper part of the clutch plate so as to release the braking of the brake device, and rotatably inserted into the main body, and a middle gear coupled to the eccentric shaft so as to be eccentrically rotatable, and partially engaged with both the lower gear and the upper gear simultaneously.

In another further preferred embodiment, the middle gear may be configured to be eccentrically rotated through while being partially engaged with the lower gear by eccentric rotation of the eccentric shaft, and simultaneously to transmit rotational force in an opposite direction to the upper gear of the clutch plate.

In still another further preferred embodiment, a difference between a number of teeth of the lower gear and a number of teeth of the upper gear may be 1 or more, and a number of teeth of the middle gear may be smaller than a larger one of the number of the teeth of the lower gear and the number of the teeth of the upper gear by 2 or more.

In yet another further preferred embodiment, the clutch plate may be rotated by 1/a number of teeth of the upper gear using the rotational force received from the middle gear, when the eccentric shaft is rotated once.

In still yet another further preferred embodiment, the brake device may include a brake plate provided in a structure configured such that a plurality of convex wedge planes is formed at equal intervals in a circumferential direction on an outer diametric part of the brake plate, and rotatably stacked on the clutch plate, support blocks configured to protrude in an outward direction between the respective wedge planes of the brake plate, and disposed between the respective push blocks of the clutch plate, brake rollers disposed between the push blocks and the support blocks, and elastic members connected to the brake rollers and supported by the support blocks so as to be compressible.

In a still further preferred embodiment, a support recess configured such that each of the elastic members is compressed by a corresponding one of the brake rollers and is inserted into the support recess may be formed in each of both sides of the support blocks.

In a yet still further preferred embodiment, the elastic members may be formed in a cylindrical shape using rubber or elastomer having elasticity so as to be compressible.

In a further preferred embodiment, at a time of stopping the clutch plate, the brake rollers may be pushed by elastic restoring force of the elastic members and be interposed between the wedge planes and the main body, and thus the braking of the brake plate may be performed.

In another further preferred embodiment, at a time of rotating the clutch plate, when the brake rollers are pushed by the push blocks, deviate from the wedge planes, and simultaneously compress the elastic members, the braking of the brake plate may be released and the brake plate may be rotated.

In still another further preferred embodiment, the swivel plate rotated together with the brake plate so as to transmit the rotational force to configured to swivel the seat to the seat when the brake plate is rotated may be mounted on the brake plate.

In yet another further preferred embodiment, a second bearing configured to guide rotation of the swivel plate may be mounted between an inner surface of an outer circumferential end of the swivel plate and an outer diametric surface of an upper part of the main body.

In still yet another further preferred embodiment, a support ring configured to support both the second bearing and the outer circumferential end of the swivel plate may be mounted on an upper surface of an outer circumferential end of the main body.

In a still further preferred embodiment, a bearing fixing ring adhered to an upper surface of the second bearing may be mounted on an upper surface of the main body so as to fix the second bearing.

In a yet still further preferred embodiment, a seat cushion frame may be mounted on the swivel plate so as to swivel the seat.

In additional aspects, vehicles are provided that comprise a seat and seat assembly as disclosed herein.

In further aspects, vehicles are provided that comprise a vehicle seat that includes a power swivel apparatus as disclosed herein.

In further aspects, vehicles are provided that comprise a power swivel apparatus as disclosed herein.

In certain aspects, a present vehicle may be an autonomous vehicle.

In a fully autonomous vehicle or system, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

In certain embodiments, the present systems and vehicles may be fully autonomous. In other certain embodiments, the present systems and vehicles may be semi-autonomous.

As referred to herein, a monopost seat assembly or monopost seat or other similar term refers to a captain's-type vehicle seat rather than a bench-type vehicle seat or seat assembly. In certain aspects, a monopost vehicle seat may not have a seat-collapsing hinge as provided with a bench-type vehicle seat.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
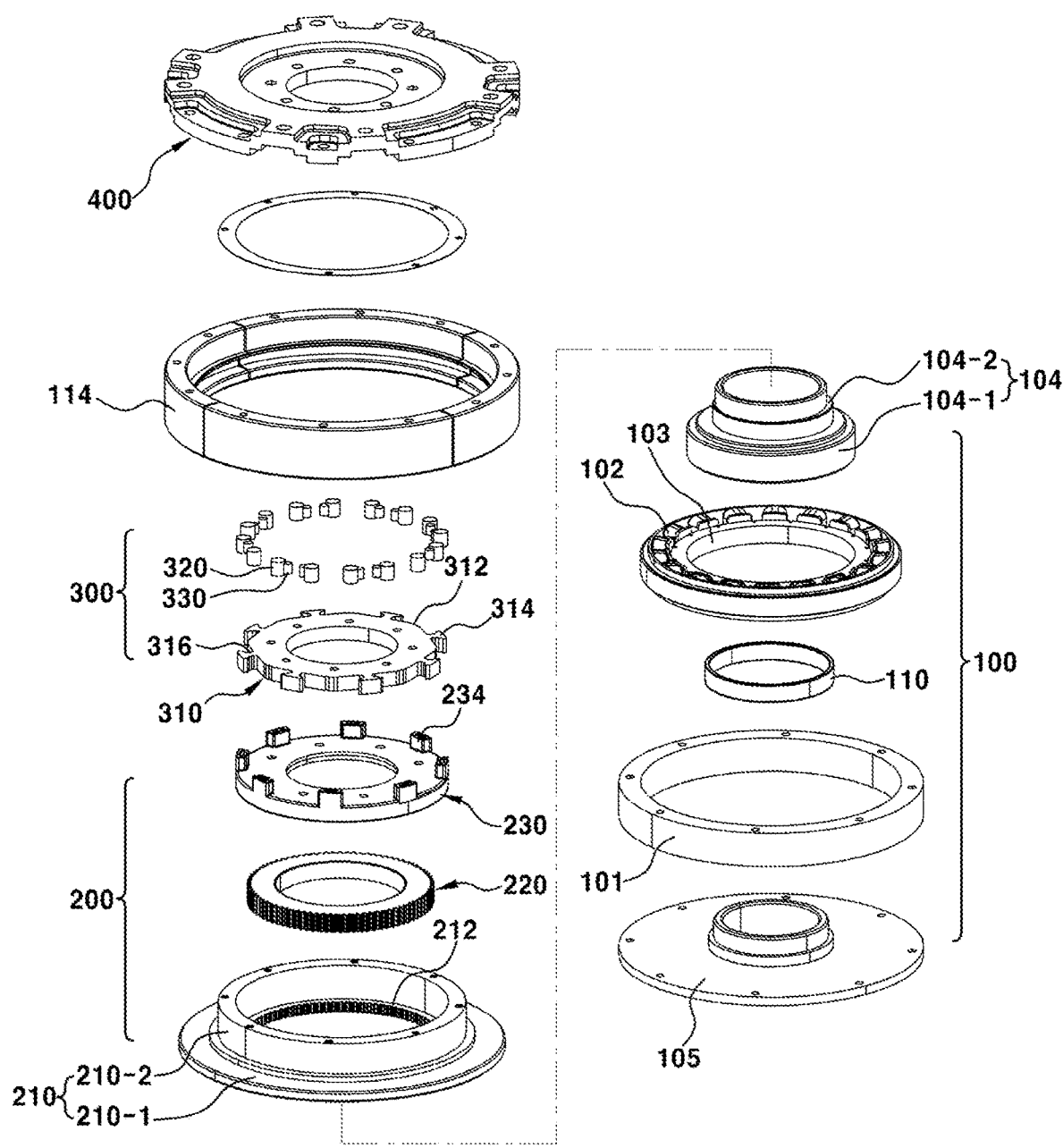
FIG. 1 is an exploded perspective view showing a power swivel apparatus of a seat for vehicles according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 2:
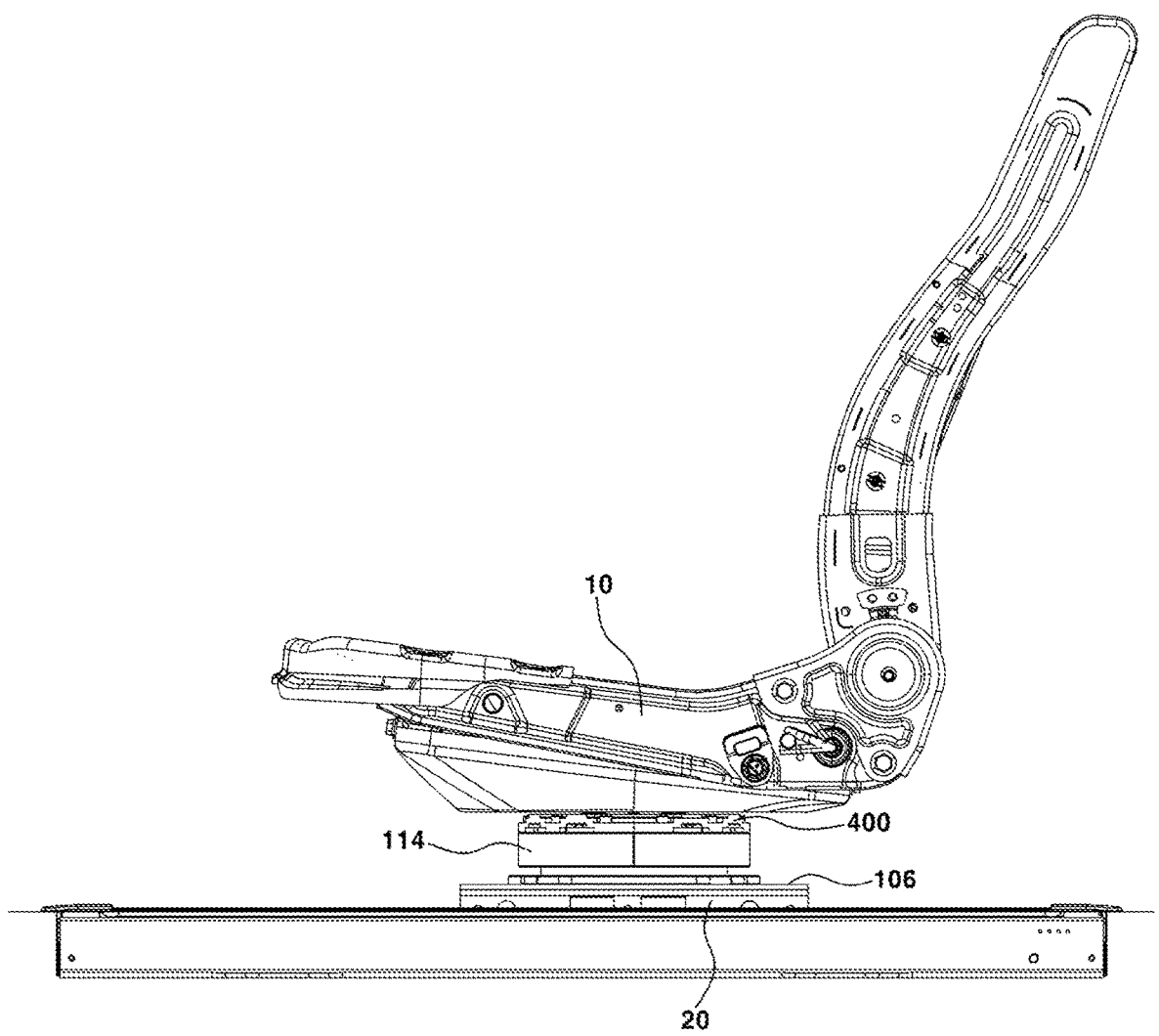
FIG. 2 is a side view showing the state in which the power swivel apparatus according to the present disclosure is mounted under the bottom part of the seat.
Figure 3:
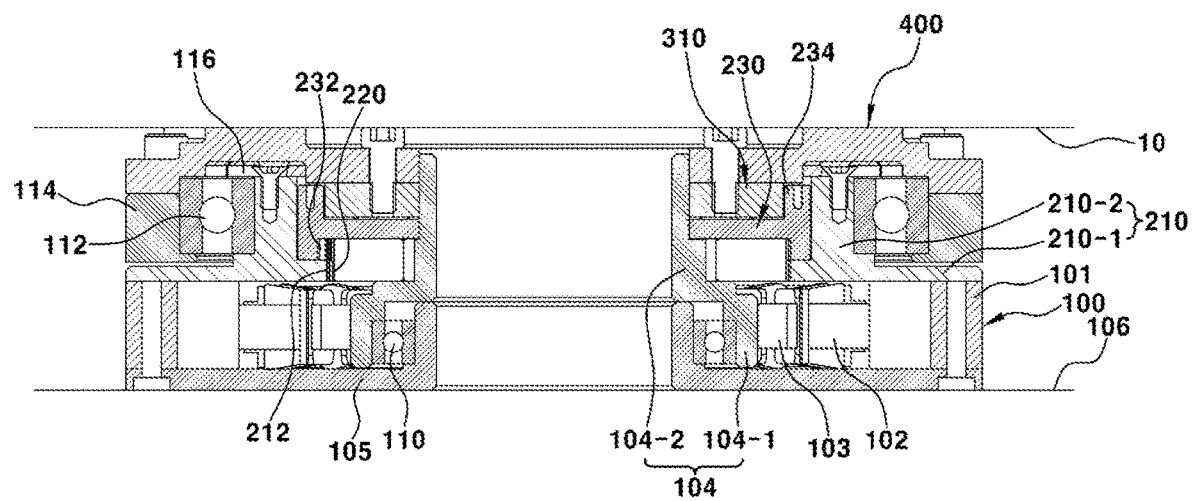
FIG. 3 is a longitudinal-sectional view showing the assembled state of the power swivel apparatus according to the present disclosure.

FIG. 1 is an exploded perspective view showing a power swivel apparatus of a seat for vehicles according to the present disclosure, and FIGS. 2 and 3 show the assembled state of the power swivel apparatus according to the present disclosure.

As shown in FIGS. 1-3, the power swivel apparatus according to the present disclosure includes a motor 100, a reduction gear device 200, a brake device 300, and a swivel plate 400, which are sequentially stacked from bottom to top.

As shown in FIGS. 2 and 3, the motor 100, the reduction gear device 200, the brake device 300, and the swivel plate 400 are sequentially stacked and assembled together, and are capable of being formed as a monopost of the seat.

In particular, the swivel apparatus, in which the motor 100, the reduction gear device 200, the brake device 300, and the swivel plate 400 are sequentially stacked, is configured to perform a monopost function of the seat, and is capable of securing a wide planarized space of a floor panel so as to improve passenger convenience in an interior of a vehicle.

The motor 100 is provided in a structure which may rotate an eccentric shaft 104 disposed at a center of the motor 100.

Figure 4:
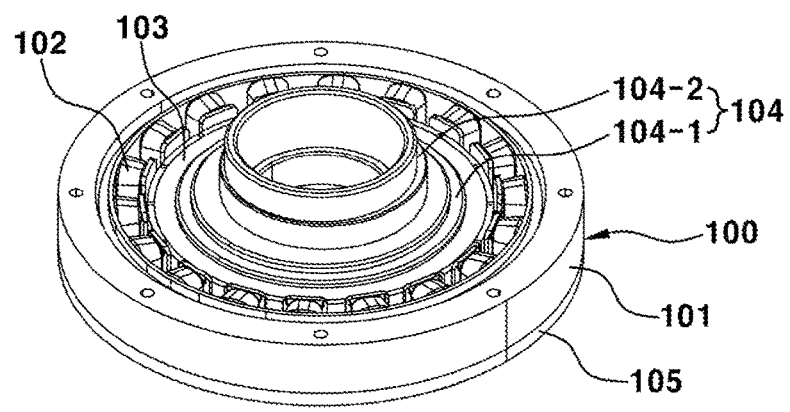
FIG. 4 is a perspective view of a motor of the power swivel apparatus according to the present disclosure.

For this purpose, the motor 100 may include, as shown in FIG. 4, a motor body 101 having a cylindrical shape with open upper and lower parts, a stator 102 mounted on an inner diametric part of the motor body 101, a rotor 103 disposed to be spaced apart from an inner circumferential surface of the stator 102 by a designated distance, the eccentric shaft 104 mounted on an inner diametric part of the rotor 103, and a motor cover 105 mounted under a bottom part of the motor body 101 and configured to cover the stator 102, the rotor 103, and the eccentric shaft 104.

The eccentric shaft 104 preferably is provided in a hollow structure in which a round part 104-1 formed at a lower part of the eccentric shaft 104 and an eccentric part 104-2 formed at an upper part of the eccentric shaft 104 are integrated with each other.

Accordingly, the rotor 103 may be disposed to be spaced apart from the inner circumferential surface of the stator 102 by the designated distance by rotatably inserting the rotor 103 and the eccentric shaft 104 into an inner diametric part of the stator 102 after the rotor 103 has been mounted on an outer circumferential surface of the round part 104-1 of the eccentric shaft 104.

Preferably, the stator 102 may be provided in a structure in which a plurality of electromagnets around which coils are wound is attached to an inner surface of a cylindrical body, and the rotor 103 may be provided in a structure in which permanent magnets divided into N and S poles are attached to the outer circumferential surface of the eccentric shaft 104.

Therefore, when the rotor 103 is rotated by three-phase current supplied to the stator 102, the eccentric shaft 104 may be rotated together with the rotor 103, and simultaneously the eccentric part 104-2 of the eccentric shaft 104 may be eccentrically rotated.

Preferably, a first bearing 110 configured to guide rotation of the eccentric shaft 104 is mounted between an inner diametric surface of a lower end of the eccentric shaft 104 and an outer diametric surface of an upper end of the motor cover 105.

That is, the first bearing 110 is mounted between an inner diametric surface of the round part 104-1 of the eccentric shaft 104 and the outer diametric surface of the upper end of the motor cover 105, and as a result, the eccentric shaft 104 may be easily rotated together with the rotor 103 under rotation guidance of the first bearing 110.

When a seat rail 20 configured to control a position of the seat in the forward and rearward directions is mounted on an interior floor panel of the vehicle, a movable plate 106 coupled to the seat rail 20 so as to be movable forwards and rearwards may be further mounted under a bottom part of the motor cover 105.

The reduction gear device 200 is connected to the eccentric shaft 104 and is stacked on the motor 100 to be assembled with the motor 100, and the reduction gear device 200 is provided in a structure which may increase output torque of the motor 100 to swivel the seat.

Figure 5:
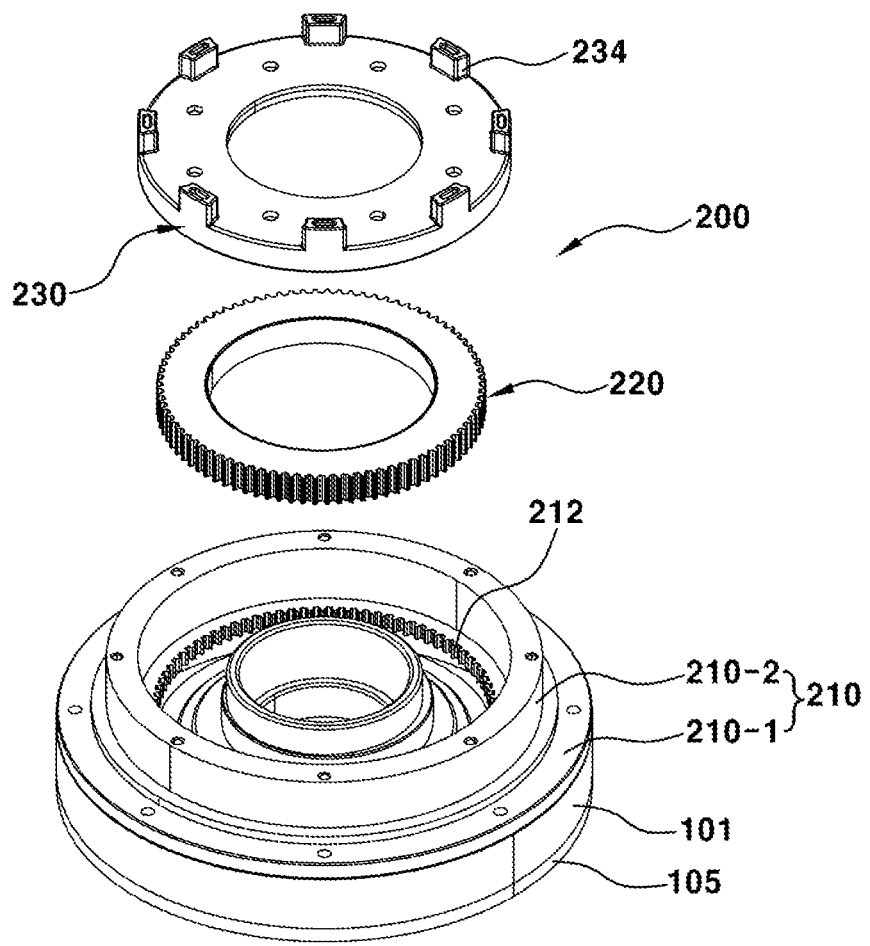
FIGS. 5 and 6 are exploded perspective views showing a reduction gear device of the power swivel apparatus according to the present disclosure.
Figure 6:
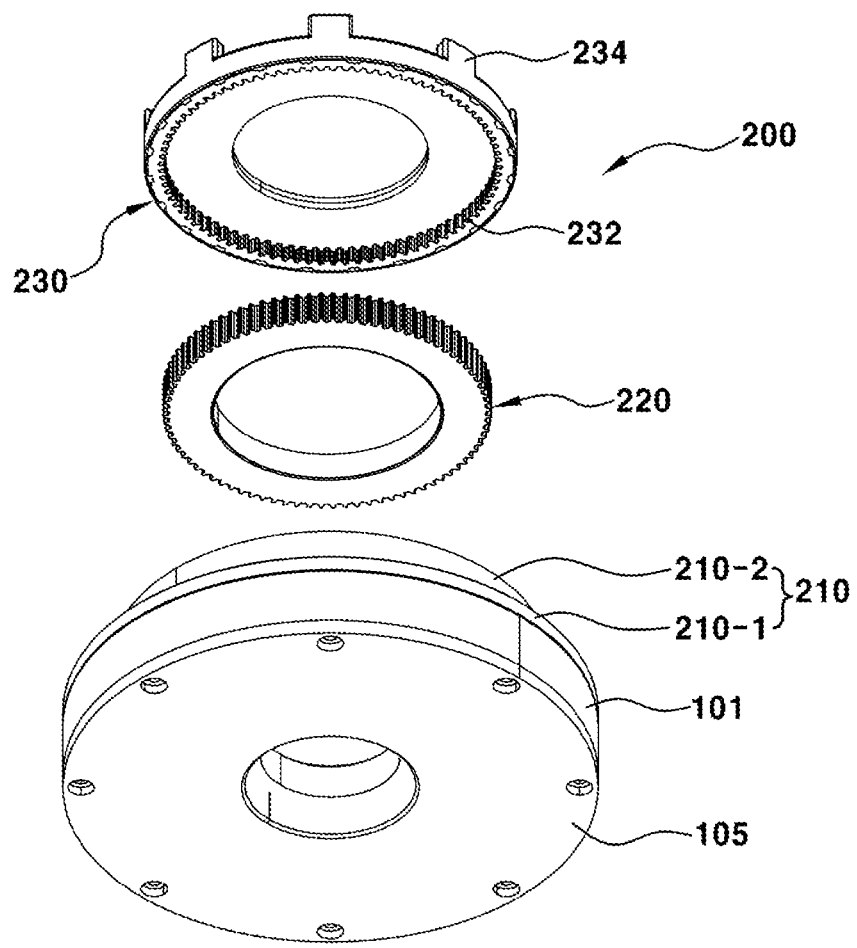

For the purpose of increasing output torque of the motor 100, the reduction gear device 200 may include, as shown in FIGS. 5 and 6, a main body 210 having a lower gear 212 formed on the main body 210, a clutch plate 230 having an upper gear 232 and a plurality push blocks 234 formed on the clutch plate 230, and a middle gear 220 simultaneously engaged with both the lower gear 212 and the upper gear 232.

The main body 210 is provided in a structure in which a disc part 210-1 stacked on the motor body 101 to be assembled with the motor body 101 and a cylindrical part 210-2 having the lower gear 212 formed as an internal gear on the inner diametric part of the main body 210 are integrated with each other.

Preferably, when the disc part 210-1 of the main body 210 is stacked on the motor body 101 to be assembled with the motor body 101, the eccentric part 104-2 of the eccentric shaft 104 is located at a center of the cylindrical part 210-2 of the main body 210.

Preferably, the middle gear 220 is formed as an external gear, is coupled to the eccentric part 104-2 of the eccentric shaft 104 so as to be eccentrically rotatable, and is partially engaged with the lower gear 212.

Preferably, the clutch plate 230 is formed as a disc-shaped ring, the upper gear 232 is formed as an internal gear along an outer circumferential end of a lower surface of the clutch plate 230, and the plurality of push blocks 234 configured to release braking of the brake device 300, which will be described below, is formed at equal intervals along an outer circumferential end of an upper surface of the clutch plate 230.

Preferably, when the clutch plate 230 is inserted into the cylindrical part 210-2 of the main body 210, the upper gear 232 of the clutch plate 230 is partially engaged with the middle gear 220.

As described above, both the lower gear 212 formed on the cylindrical part 210-2 of the main body 210 and the upper gear 232 of the clutch plate 230 are simultaneously partially engaged with the middle gear 220.

Accordingly, the middle gear 220 is eccentrically rotated through partial engagement with the lower gear 212 by eccentric rotation of the eccentric shaft 104, and simultaneously serves to transmit rotational force in an opposite direction to the upper gear 232 of the clutch plate 230.

For this purpose, a difference between a number of teeth of the lower gear 212 and a number of teeth of the upper gear 232 is 1 or more, and a number of teeth of the middle gear 220 is smaller than a larger one of the number of the teeth of the lower gear 212 and the number of the teeth of the upper gear 232 by 2 or more.

In one example, the number of the teeth of the lower gear 212 is 80, the number of the teeth of the upper gear 232 is 79, and the number of the teeth of the middle gear 220 is 78.

Therefore, when the eccentric shaft 104 is rotated once by driving the motor 100, the clutch plate 230 may be rotated by 1/the number of teeth of the upper gear 232 using the rotational force received from the middle gear 220.

Figure 7:
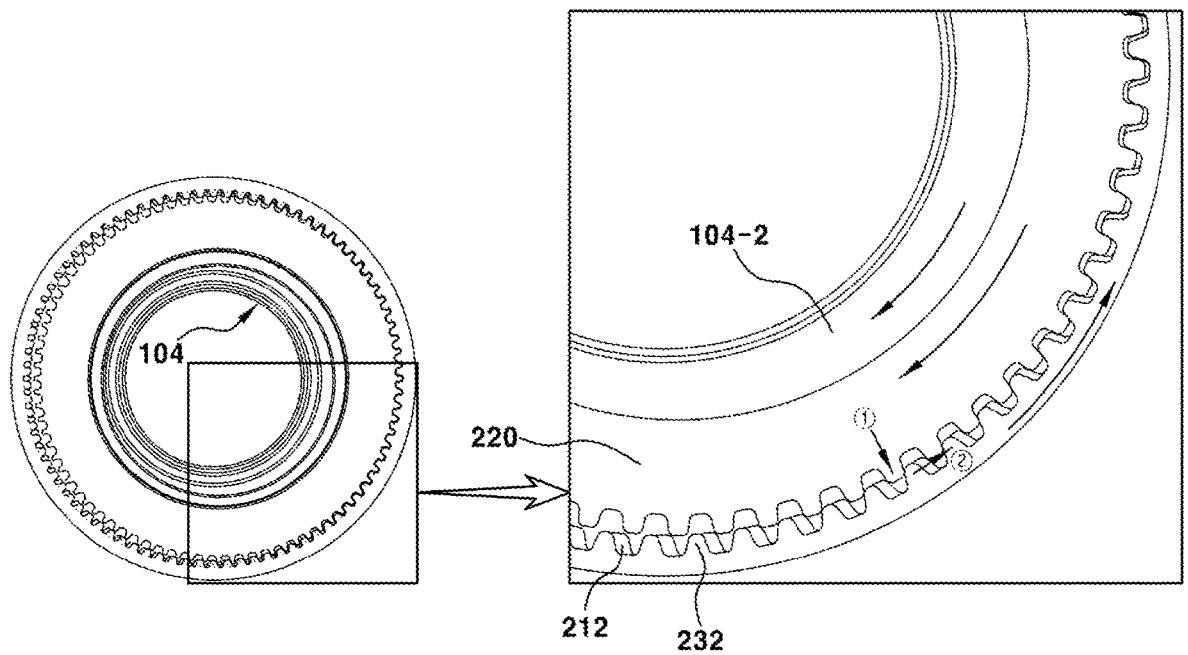
FIG. 7 is a cross-sectional view showing the reduction gear device of the power swivel apparatus according to the present disclosure.

As shown in FIG. 7, when the eccentric part 104-2 of the eccentric shaft 104 is eccentrically rotated in one direction and simultaneously the middle gear 220 coupled to the eccentric part 104-2 is eccentrically rotated in the same direction by driving the motor 100, the teeth of the middle gear 220 are inserted between the respective teeth of the lower gear 212 in a direction of arrow ① shown in FIG. 7, and simultaneously, push the teeth of the gear of the upper gear 232 in the other direction, i.e., in a direction of arrow ② shown in FIG. 7, and as a result, the clutch plate 230 having the upper gear 232 may be rotated in the other direction by 1/the number of the teeth of the upper gear 232.

Consequently, when the eccentric shaft 104 and the middle gear 220 are continuously rotated in one direction by driving the motor 100, the clutch plate 230 having the upper gear 232 may be easily rotated in the other direction, and the output torque of the motor 100 to swivel the seat may be increased.

The brake device 300 is configured such that braking of the brake device 300 is released by the clutch plate 230 rotated by the eccentric rotational force of the reduction gear device 200 at the time of driving the motor 100, and the braking device 300 exhibits braking force to stop the seat without movement and noise at the time of stopping the motor 100.

Figure 8:
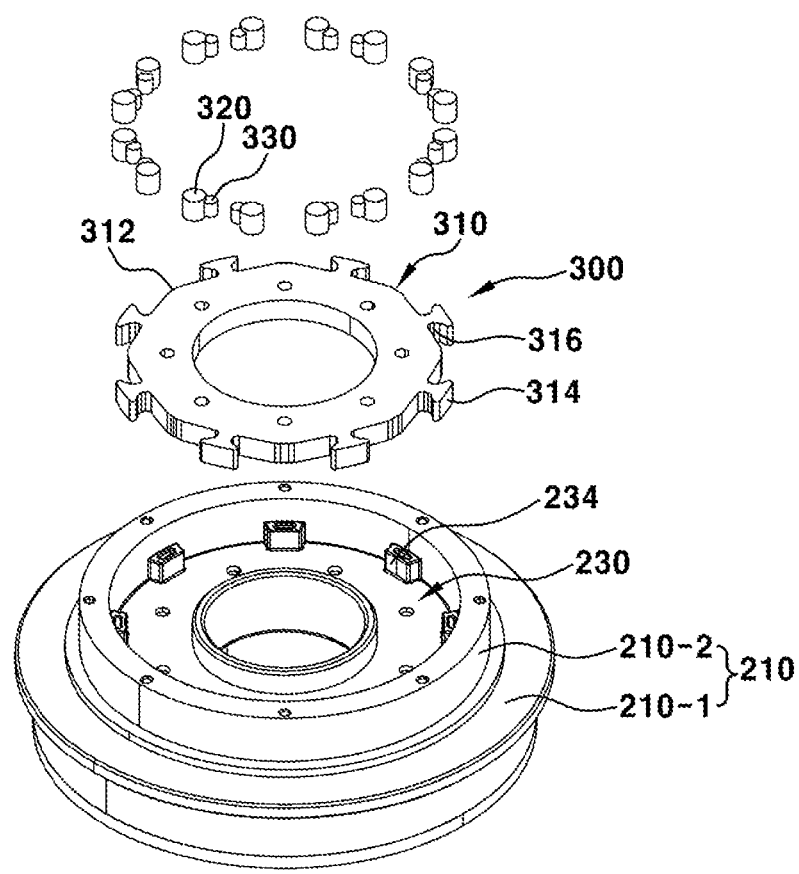
FIG. 8 is an exploded perspective view showing a brake device of the power swivel apparatus according to the present disclosure.
Figure 9:
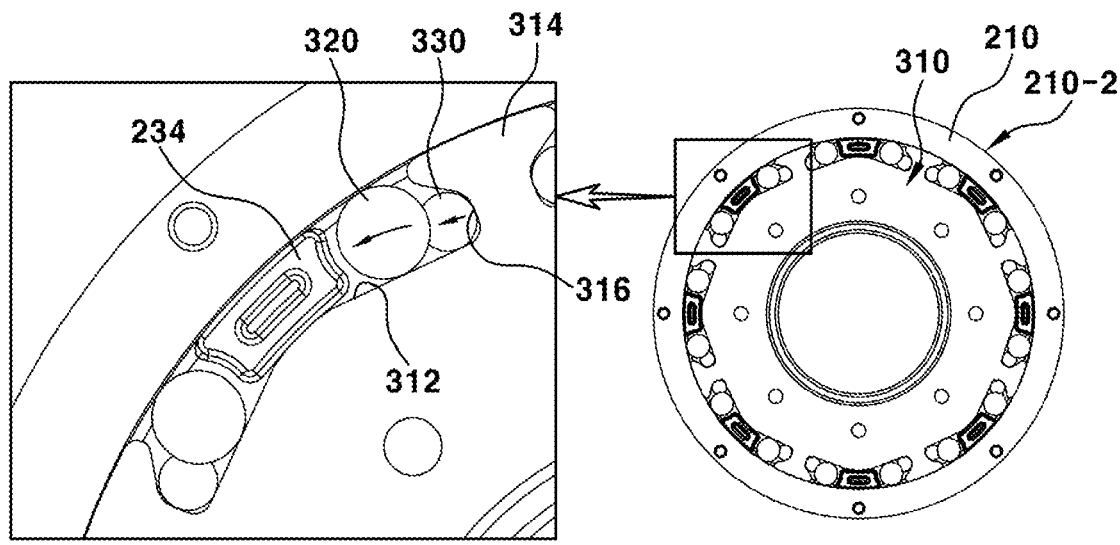
FIG. 9 is a plan view showing the state in which braking of the brake device of the power swivel apparatus according to the present disclosure is performed.
Figure 10:
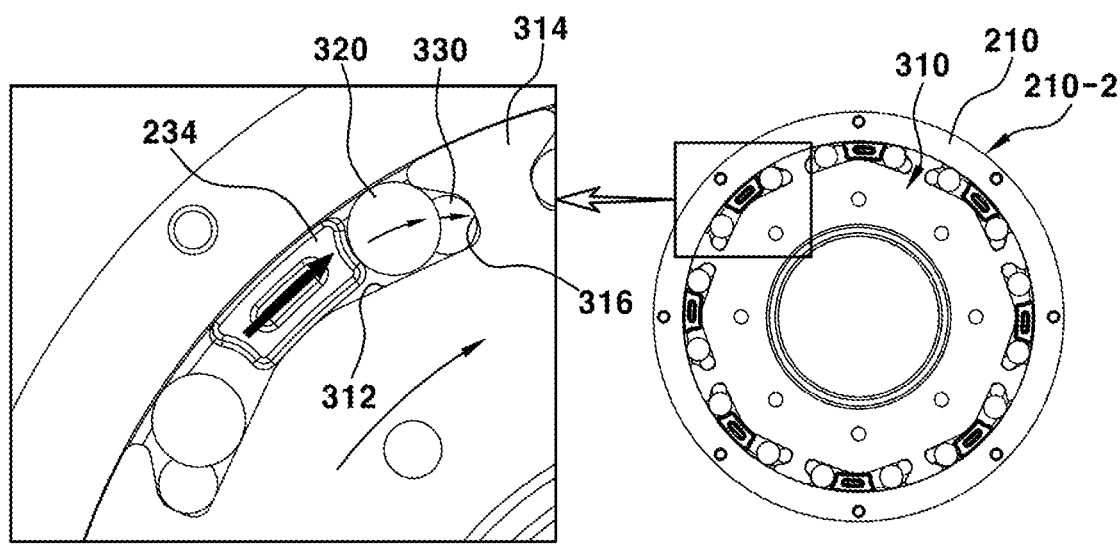
FIG. 10 is a plan view showing the state in which braking of the brake device of the power swivel apparatus according to the present disclosure is released.

For this purpose, the brake device 300 may include, as shown in FIGS. 8-10, a brake plate 310 rotatably stacked on the clutch plate 230, and a plurality of plate rollers 320 and elastic members 330 configured to release braking of the brake plate 310 or to brake (or stop) the brake plate 310.

The brake plate 310 is configured in a structure in which a plurality of convex wedge planes 312 is formed at equal intervals in the circumferential direction on the outer diametric part of the brake plate 310, and support blocks 314 protrude in the outward direction between the respective wedge planes 312.

Preferably, when the brake plate 310 is rotatably stacked on the clutch plate 230, the support blocks 314 are disposed between the respective push blocks 234 of the clutch plate 230.

The brake rollers 320 are provided in a cylindrical shape, are disposed between the push blocks 234 and the support blocks 314 in the circumferential direction, and are simultaneously disposed between the outer diametric surface of the brake plate 310 and the inner diametric surface of the cylindrical part 210-2 of the main body 210 in the radial direction.

Each of the elastic members 330 is connected to one side of a corresponding one of the brake rollers 320 and is supported by a corresponding one of the support blocks 314 so as to be compressible, and may be formed in a cylindrical shape using rubber or an elastomer having elasticity.

Preferably, a support recess 316, into which the elastic member 330 may be compressibly inserted, is formed in each of both sides of the support blocks 314.

Therefore, when the eccentric rotational force of the eccentric shaft 104 and the middle gear 220 caused by driving the motor 100 is transmitted to the upper gear 232 and thus the clutch plate 230 is rotated, the push blocks 234 of the clutch plate 230 push the bake rollers 320 in the circumferential direction, and consecutively, the brake rollers 320 deviate from the wedge planes 312 of the brake plate 310 and simultaneously compress the elastic members 330 supported by the support blocks 314, and as a result, braking of the brake plate 310 may be released.

Preferably, the elastic members 330 are compressed, and are inserted into the support recesses 316 formed in the support blocks 314.

Thereafter, as the clutch plate 230 is rotated, a force of the push blocks 234 pushing the brake rollers 320 in the circumferential direction is applied to the support blocks 314 through the elastic members 330, and as a result, the brake plate 310 may be rotated.

On the other hand, when the eccentric shaft 104, the middle gear 220, and the clutch plate 230 having the upper gear 232 are stopped by stopping driving of the motor 100, the brake rollers 320 are pushed by the elastic restoring force of the elastic members 330 and are interposed between the wedge planes 312 of the brake plate 310 and the inner circumferential surface of the cylindrical part 210-2 of the main body 210, and as a result, braking of the brake plate 310 may be performed.

The swivel plate 400 is stacked on the brake plate 310 of the brake device 300, and is assembled with the brake plate 310 using bolts or the like, so as to transmit rotational force to swivel the seat to the seat.

Therefore, the swivel plate 400 may transmit the rotational force to swivel the seat to the seat while being rotated together with the brake plate 310 when the brake plate 310 is rotated.

Preferably, in order to softly and smoothly rotate the swivel plate 400, a second bearing 112 configured to guide rotation of the swivel plate 400 is mounted between the inner surface of an outer circumferential end of the swivel plate 400 and the outer diametric surface of the cylindrical part 210-2 of the main body 210.

Preferably, a support ring 114 configured to support both the lower part of the second bearing 112 and the lower part of the outer circumferential end of the swivel plate 400 may be mounted on the disc part 210-1 of the main body 210 so as to accurately fix the second bearing 112 to a position to guide rotation of the swivel plate 400.

More preferably, a bearing fixing ring 116 adhered to the upper surface of the second bearing 112 may be further mounted on the upper surface of the cylindrical part 210-2 of the main body 210 so as to prevent the second bearing 112 from being lifted upwards or shaken at the time of guiding rotation of the swivel plate 400.

A seat cushion frame 10 of the seat is mounted on the swivel plate 400 so as to swivel the seat.

When the swivel plate 400 is rotated together with the brake plate 310 when the brake plate 310 is rotated, the seat cushion frame 10 mounted on the swivel plate 400 may also be rotated together with the swivel plate 400, and as a result, the swiveling operation of the seat may be performed.

Hereinafter, the operation of the power swivel apparatus having the above-described configuration according to the present disclosure will be described as follows.

First, when the rotor 103 is rotated by driving the motor 100, the eccentric shaft 104 coupled to the rotor 103 is rotated, the eccentric part 104-2 of the eccentric shaft 104 is eccentrically rotated, and the middle gear 220 coupled to the eccentric part 104-2 of the eccentric shaft 104 is eccentrically rotated.

Preferably, the middle gear 220 is eccentrically rotated while being partially engaged with the lower gear 212, and simultaneously transmits rotational force in the opposite direction to the upper gear 232 of the clutch plate 230.

That is, when the eccentric part 104-2 of the eccentric shaft 104 is eccentrically rotated in one direction and simultaneously the middle gear 220 coupled to the eccentric part 104-2 is eccentrically rotated in the direction, as described above, the teeth of the middle gear 220 are inserted between the respective teeth of the lower gear 212 in the direction of arrow ① shown in FIG. 7, and simultaneously, push the teeth of the gear of the upper gear 232 in the other direction, i.e., in the direction of arrow ② shown in FIG. 7, and as a result, the clutch plate 230 having the upper gear 232 may be rotated in the other direction by 1/the number of teeth of the upper gear 232.

When the eccentric shaft 104 and the middle gear 220 are continuously rotated in one direction, the clutch plate 230 having the upper gear 232 may be consecutively rotated in the other direction.

Preferably, when the clutch plate 230 is rotated due to transmission of the eccentric rotational force of the middle gear 220 to the upper gear 232, the push blocks 234 of the clutch plate 230 push the brake rollers 320 in the circumferential direction.

Thereby, the brake rollers 320 deviate from the wedge planes 312 of the brake plate 310 and simultaneously compress the elastic members 330 supported by the support blocks 314, and thus braking of the brake plate 310 may be released.

Continuously, as the clutch plate 230 is rotated, the force of the push blocks 234 pushing the brake rollers 320 in the circumferential direction is applied to the support blocks 314 through the elastic members 330, and as a result, the brake plate 310 may be rotated.

Simultaneously, the swivel plate 400 mounted on the brake plate 310 is rotated together with the brake plate 310 when the brake plate 310 is rotated, and transmits rotational force to swivel the seat to the seat.

Therefore, when the swivel plate 400 mounted on the brake plate 310 is rotated together with the brake plate 310 when the brake plate 310 is rotated, the seat cushion frame 10 mounted on the swivel plate 400 are also rotated, and thus the swiveling operation of the seat may be performed.

As described above, the seat may be easily swiveled to a desired position without interference with peripheral parts for the purpose of multilateral conferences and conversations, sleeping, relaxation, assistance in boarding and alighting, etc., within the limited space of the interior of the vehicle.

On the other hand, during the swiveling operation of the seat, the seat may be accurately stopped at a desired position without movement and noise by the brake device 300.

For this purpose, when driving of the motor 100 is stopped, the eccentric shaft 104, the middle gear 220, and the clutch plate 230 having the upper gear 232 are also stopped.

Preferably, the force of the push blocks 320 pushing the brake rollers 320 is released when the clutch plate 230 is stopped, and thus the force of the push blocks 320 compressing the elastic members 330 connected to the brake rollers 320 is also released.

Therefore, the brake rollers 320 are pushed in an opposite direction by the elastic restoring force of the elastic members 330 and are interposed between the wedge planes 312 of the brake plate 310 and the inner circumferential surface of the cylindrical part 210-2 of the main body 210, and as a result, braking of the brake plate 310 may be performed and thus the brake plate 310 may be stopped.

Accordingly, when the brake plate 310 is stopped, the swivel plate 400 stacked on the brake plate 310 is stopped, the seat cushion frame 10 mounted on the swivel plate 400 is stopped, and thus the seat may be easily stopped at the desired position during the swiveling operation of the seat.

As above, when the seat is stopped during the swiveling operation of the seat, the seat may be accurately stopped at a desired position without movement and noise by the brake device 300, and as a result, the quality and performance of such a swivel seat may be improved.

As is apparent from the above description, the present disclosure provides the following effects through the above-described configuration and connection and usage relations.

First, a power swivel apparatus of a seat for vehicles according to the present disclosure may easily rotate the seat to a desired position without interference with peripheral parts for the purpose of multilateral conferences and conversations, sleeping, relaxation, assistance in boarding and alighting, etc. in the limited space of the interior of a vehicle.

Second, the power swivel apparatus according to the present disclosure performs a monopost function, thereby being capable of securing a wide planarized space of a floor panel and thus improving passenger convenience in the interior of the vehicle.

Third, the power swivel apparatus according to the present disclosure may accurately stop the seat at a desired position without movement and noise through a brake device when the seat is stopped during the swiveling operation of the seat, thereby being capable of improving the quality and performance of such a swivel seat.

Fourth, the power swivel apparatus according to the present disclosure connects a reduction gear device to an eccentric shaft of a motor, thereby being capable of easily increasing the output torque of the motor to swivel the seat while eccentrically rotating gears of the reduction gear device.

The disclosure has been described in detail with reference to preferred embodiments thereof. However, it should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

What is claimed is:

1. A power swivel apparatus of a seat for a vehicle, the power swivel apparatus comprising:
   a motor having an eccentric shaft;
   a reduction gear device connected to the eccentric shaft of the motor;
   a brake device configured such that braking of the brake device is released by eccentric rotational force of the reduction gear at a time of driving the motor and apply braking force to stop the seat at a time of stopping driving of the motor; and
   a swivel plate connected to the brake device and configured to transmit rotational force so as to swivel the seat.

2. The power swivel apparatus of claim 1, wherein the motor, the reduction gear device, the brake device, and the swivel plate are sequentially stacked from bottom to top so as to be formed as a monopost of the seat.

3. The power swivel apparatus of claim 1, wherein the motor comprises:
   a motor body;
   a stator mounted on an inner diametric part of the motor body; and
   a rotor mounted on an outer circumferential surface of the eccentric shaft and disposed to be spaced apart from the stator by a designated distance,
   wherein the eccentric shaft is provided in a structure configured such that a round part inserted into the rotor is formed at a lower part of the eccentric shaft, and an eccentric part configured to transmit the eccentric rotational force to the reduction gear device is formed at an upper part of the eccentric shaft.

4. The power swivel apparatus of claim 3, wherein a motor cover configured to cover the stator, the rotor, and the eccentric shaft is mounted under a bottom part of the motor body.

5. The power swivel apparatus of claim 4, wherein a first bearing configured to guide rotation of the eccentric shaft is mounted between an inner diametric surface of a lower end of the eccentric shaft and an outer diametric surface of an upper end of the motor cover.

6. The power swivel apparatus of claim 4, wherein a movable plate coupled to a seat rail so as to be movable forwards and rearwards is mounted under a bottom part of the motor cover.

7. The power swivel apparatus of claim 1, wherein the reduction gear device comprises:
   a main body having a lower gear formed on an inner diametric part of the main body, and stacked on the motor body to be assembled with the motor body;
   a clutch plate having an upper gear formed as an internal gear on a lower part of the clutch plate, and a plurality of push blocks formed on an upper part of the clutch plate so as to release the braking of the brake device, and rotatably inserted into the main body; and
   a middle gear coupled to the eccentric shaft so as to be eccentrically rotatable, and partially engaged with both the lower gear and the upper gear simultaneously.

8. The power swivel apparatus of claim 7, wherein the middle gear is configured to be eccentrically rotated through while being partially engaged with the lower gear by eccentric rotation of the eccentric shaft, and simultaneously to transmit rotational force in an opposite direction to the upper gear of the clutch plate.

9. The power swivel apparatus of claim 8, wherein a difference between a number of teeth of the lower gear and a number of teeth of the upper gear is 1 or more, and a number of teeth of the middle gear is smaller than a larger one of the number of the teeth of the lower gear and the number of the teeth of the upper gear by 2 or more.

10. The power swivel apparatus of claim 8, wherein the clutch plate is rotated by 1 divided by a number of teeth of the upper gear using the rotational force received from the middle gear, when the eccentric shaft is rotated once.

11. The power swivel apparatus of claim 7, wherein the brake device comprises:
- a brake plate provided in a structure configured such that a plurality of convex wedge planes is formed at equal intervals in a circumferential direction on an outer diametric part of the brake plate, and rotatably stacked on the clutch plate;
- support blocks configured to protrude in an outward direction between the respective wedge planes of the brake plate, and disposed between the respective push blocks of the clutch plate;
- brake rollers disposed between the push blocks and the support blocks; and
- elastic members connected to the brake rollers and supported by the support blocks so as to be compressible.

12. The power swivel apparatus of claim 11, wherein a support recess configured such that each of the elastic members is compressed by a corresponding one of the brake rollers and is inserted into the support recess is formed in each of both sides of the support blocks.

13. The power swivel apparatus of claim 11, wherein, at a time of stopping the clutch plate, the brake rollers are pushed by elastic restoring force of the elastic members and are interposed between the wedge planes and the main body, and thus the braking of the brake plate is performed.

14. The power swivel apparatus of claim 11, wherein, at a time of rotating the clutch plate, when the brake rollers are pushed by the push blocks, deviate from the wedge planes, and simultaneously compress the elastic members, the braking of the brake plate is released and the brake plate is rotated.

15. The power swivel apparatus of claim 14, wherein the swivel plate rotated together with the brake plate so as to transmit the rotational force to configured to swivel the seat to the seat when the brake plate is rotated is mounted on the brake plate.

16. The power swivel apparatus of claim 15, wherein a second bearing configured to guide rotation of the swivel plate is mounted between an inner surface of an outer circumferential end of the swivel plate and an outer diametric surface of an upper part of the main body and/or wherein a support ring configured to support both the second bearing and the outer circumferential end of the swivel plate is mounted on an upper surface of an outer circumferential end of the main body.

17. The power swivel apparatus of claim 16, wherein a bearing fixing ring adhered to an upper surface of the second bearing is mounted on an upper surface of the main body so as to fix the second bearing.

18. The power swivel apparatus of claim 15, wherein a seat cushion frame is mounted on the swivel plate so as to swivel the seat.

19. A vehicle comprising a vehicle seat including the power swivel apparatus of claim 1.

20. A vehicle seat comprising the power swivel apparatus of claim 1.

* * * * *